(12) United States Patent
Peerlings

(10) Patent No.: US 7,016,023 B2
(45) Date of Patent: Mar. 21, 2006

(54) CHROMATIC DISPERSION MEASUREMENT

(75) Inventor: Joachim Peerlings, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/739,693

(22) Filed: Dec. 18, 2003

(65) Prior Publication Data

US 2004/0169848 A1     Sep. 2, 2004

(30) Foreign Application Priority Data

Feb. 21, 2003     (EP) ................................. 03100430

(51) Int. Cl.
*G01N 21/00* (2006.01)
(52) U.S. Cl. ..................................... 356/73.1
(58) Field of Classification Search ............... 356/73.1, 356/364–369; 250/225, 227.14–227.18, 250/227.23
See application file for complete search history.

(56) References Cited

U.S. PATENT DOCUMENTS

| | | | |
|---|---|---|---|
| 5,969,806 A | 10/1999 | Bergano | 356/73.1 |
| 6,654,104 B1 * | 11/2003 | Kimura et al. | 356/73.1 |
| 6,781,678 B1 * | 8/2004 | Aoki et al. | 356/73.1 |
| 2002/0044274 A1 | 4/2002 | Kimura et al. | 356/73.1 |

FOREIGN PATENT DOCUMENTS

| | | |
|---|---|---|
| EP | 1211499 A2 | 6/2002 |
| WO | WO 02/16901 A2 | 2/2002 |

OTHER PUBLICATIONS

Deragon et al., "An Analysis and Comparison of OTDR, Photon Counting and Differential Phase Shift Techniques for Field Chromatic Dispersion Measurements", National Fiber Optics Engineers Conference, Technical Proceedings, 2001, pp. 1585-1594.

"An Analysis and Comparison of OTDR, Photon Counting and Differential Phase Shift Techniques for Field Chromatic Dispersion Measurements", Aaron T. Deragon, et al., NOFOEC 2001, pp. 1585-1594.

* cited by examiner

*Primary Examiner*—Tu T. Nguyen

(57) ABSTRACT

The present invention relates to a method and to an apparatus for measuring an optical property, such as group delay or chromatic dispersion, of a DUT, comprising: a first coupler connected to the DUT for coupling a first optical signal having a first wavelength and a second optical signal having a second wavelength into the DUT, the second wavelength being variable with respect to the first wavelength, a detector connected to the DUT for detecting the first and the second signal leaving the DUT, an evaluation unit connected to the detector, for determining a difference in runtime, if any, between the first and the second signal having traveled at least one time through the DUT and for deriving the optical property from the detected difference.

11 Claims, 6 Drawing Sheets

CHROMATIC DISPERSION MEASUREMENT

BACKGROUND OF THE INVENTION

1. Field of the Invention

The present invention relates to the measurement of an optical property, such as group delay or chromatic dispersion, of a device under test (DUT).

2. Brief Description of Related Developments

A common way of measuring chromatic dispersion, e.g. defined by the dispersion coefficient D, is the so-called "Spectral Group Delay Measurement in the Time Domain"-method described e.g. in "An analysis and comparison of OTDR, photon counting and differential phase shift techniques for field chromatic dispersion measurements" by Aaron T. Deragon et al., NFOEC 2001, pp. 1585–1594. This method uses at least four or even more wavelengths generating devices at a time to measure chromatic dispersion. This method is also known as Time-of-Flight (TOF) method.

Solutions that use the TOF method are commercially available today from e.g. Anritsu Corporation or Luciol Instruments. These available prior art methods work from one end or from both ends. To illustrate the prior art methods a prior art method working from one end (single-ended) is shown in FIG. 1 and a prior art method working from both ends (dual-ended) is shown in FIG. 2. Features that are substantially or functionally equal or similar will be referred to with the same reference sign(s).

According to FIG. 1 at least four pulsed light beams 1 each having a fixed but different wavelength $\lambda_1$ to $\lambda_n$ are provided being pulsed by direct modulation or using an external modulator 7.

The beams are then coupled together by a coupler 2 and send over a fiber 5 as the DUT to a fiber termination (e.g. straight connector or mirror 6) providing an end reflex, which reflects the beam to an additional coupler 3, which couples the light into a detector 4.

The additional coupler 3 is used for the single-ended measurements only. For dual-ended measurements according to FIG. 2 several light beams 1 each having a fixed but different wavelength $\lambda_1$ to $\lambda_n$ are pulsed by a modulator 7 by direct or external modulation and coupled together by a coupler 2 and send over a fiber 5 as the device under test (DUT) which emits the light direct into a detector 4.

At the detectors 4 the group delay of the fiber 5 is measured as shown in an example according to FIG. 3.

From the group delay the derivation $D = 1/L \ast d\lambda group/d\lambda$ can be derived, with L being the length of the fiber 5. D is the dispersion coefficient of the fiber 5. The dispersion coefficient D is shown in FIG. 4.

It is also known in the prior art to use a broadband light source instead of several lasers and generate the different wavelengths through wavelength selective devices. The different wavelengths can be generated at the beginning or at the end of the fiber to be tested.

SUMMARY OF THE INVENTION

It is an object of the invention to provide improved measurement of optical properties.

The object is solved by the independent claims.

The current invention preferably uses only two wavelength generating devices. Preferably, a fixed wavelength source and a variable wavelength source are used to measure chromatic dispersion with the "Spectral Group Delay Measurement in the Time Domain"-method. One realization could be a fixed laser source and a tunable laser source.

An advantage of the present invention is the possibility to measure the CD of a DUT comprising an element being selective to the wavelength of the light beam used for the measurement. Another advantage of the present invention is the possibility to measure the CD of a DUT comprising an optical amplifying element. Both advantages could not be achieved in the prior art using broadband light sources.

Furthermore, the setup can be simplified compared to the prior art setup because a separate communication fiber connected to the detector to measure the wavelengths of the light beams can be omitted since the DUT itself is used to transmit this wavelength information to the detector.

The modulator can be implemented into the light sources for direct modulation of these sources, can be placed outside for indirect modulation of these sources, and/or can be placed between the coupler and the DUT.

Preferred embodiments are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS

Figure 1:
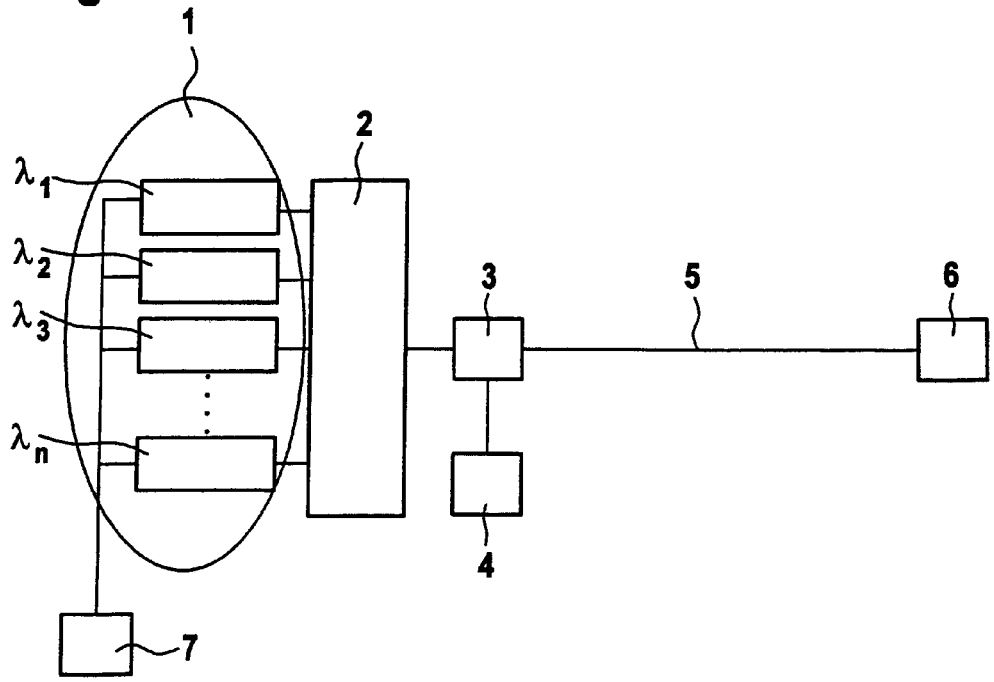
FIGS. 1 and 2 show schematic illustrations of measurement setups for measuring the dispersion coefficient D according to the prior art.
Figure 2:
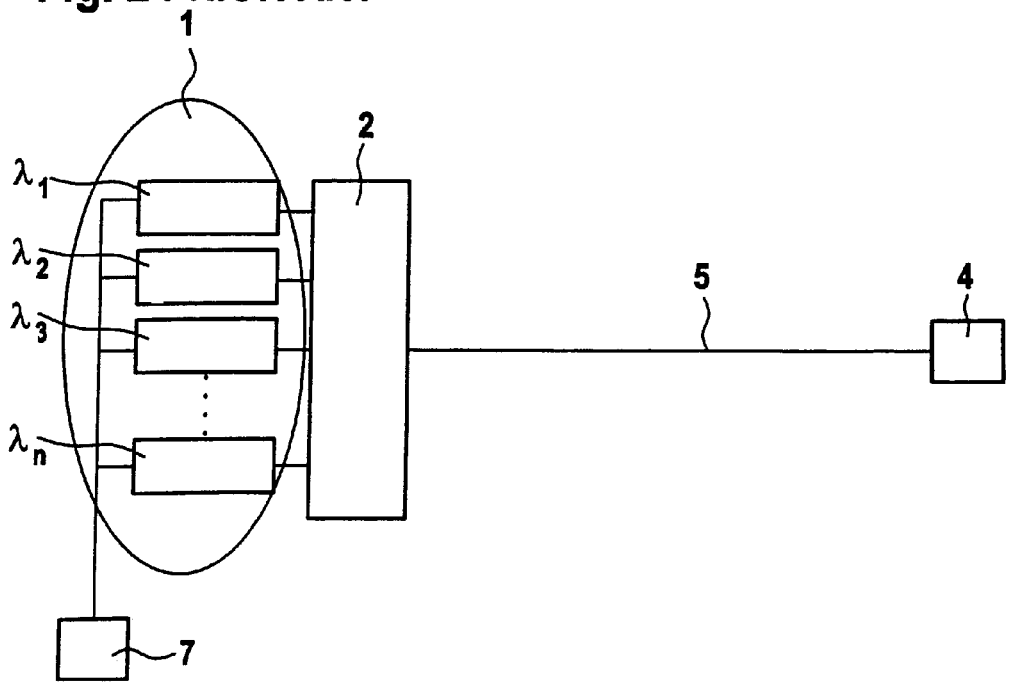
Figure 3:
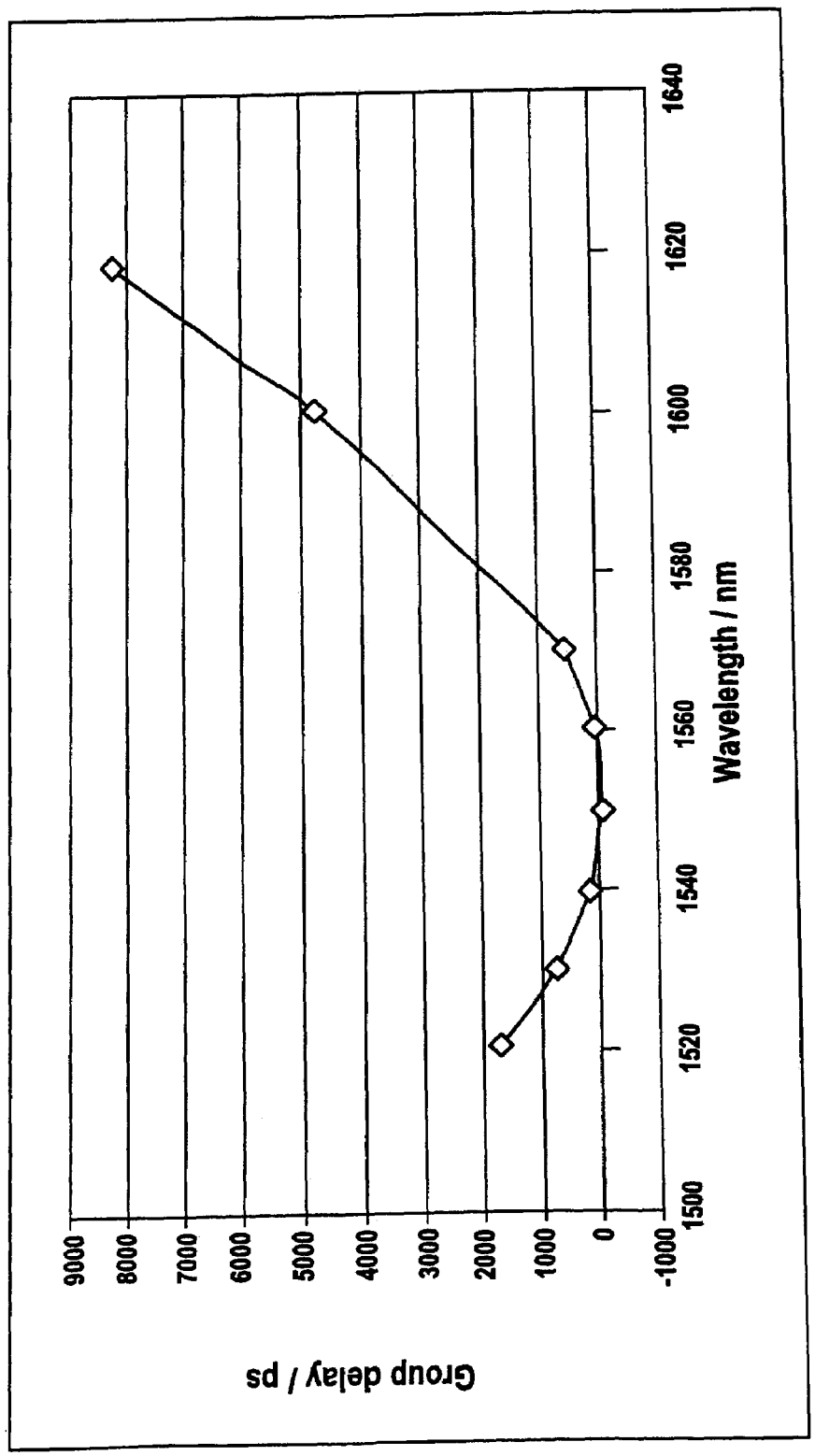
FIGS. 3 and 4 show graphs illustrating the results using the measurement setups of FIGS. 1 and 2.
Figure 4:
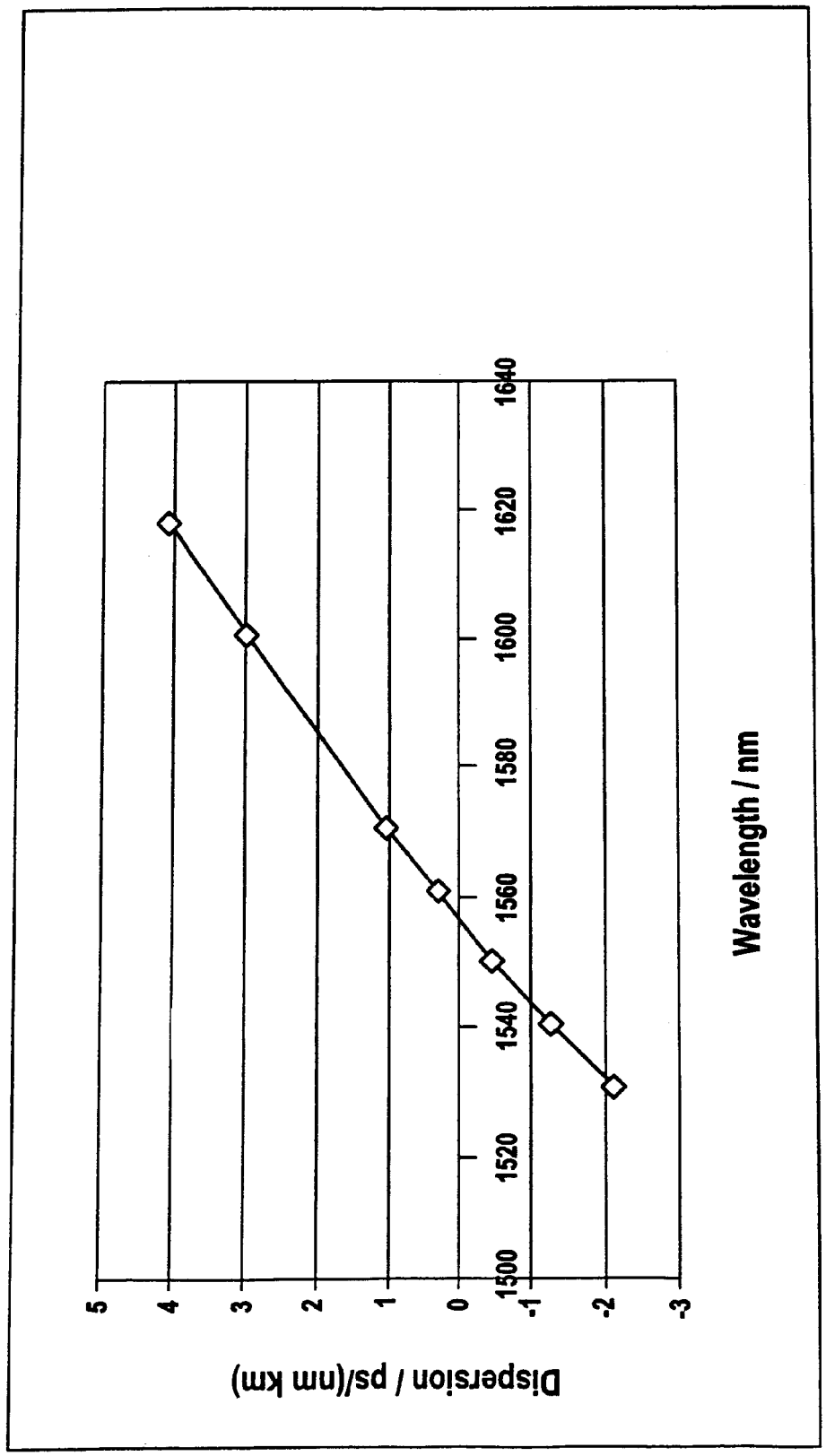
Figure 5:
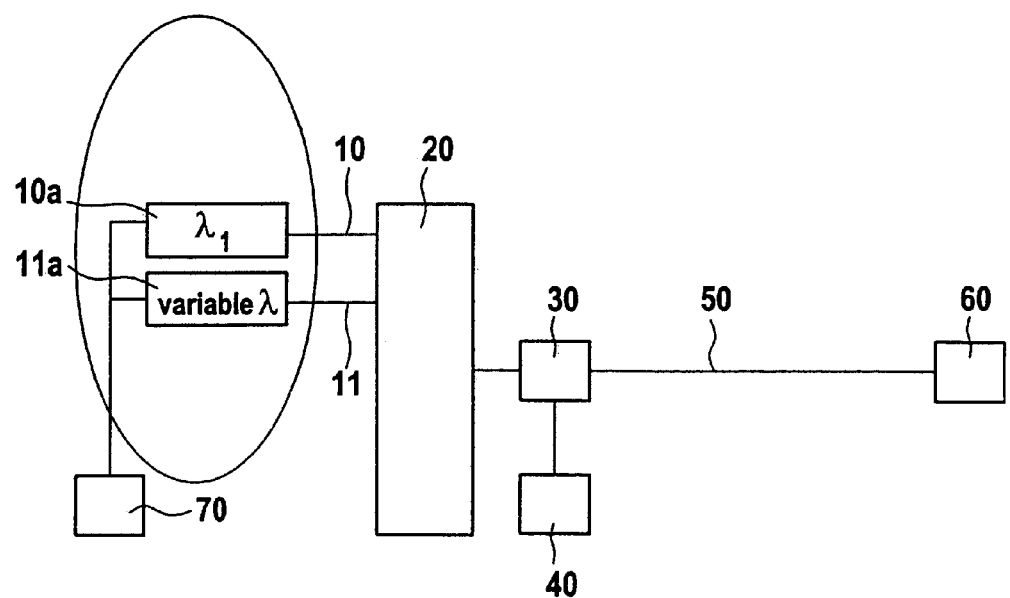
FIGS. 5 and 6 show schematic illustrations of measurement setups for measuring the dispersion coefficient D according to embodiments of the present invention.
Figure 6:
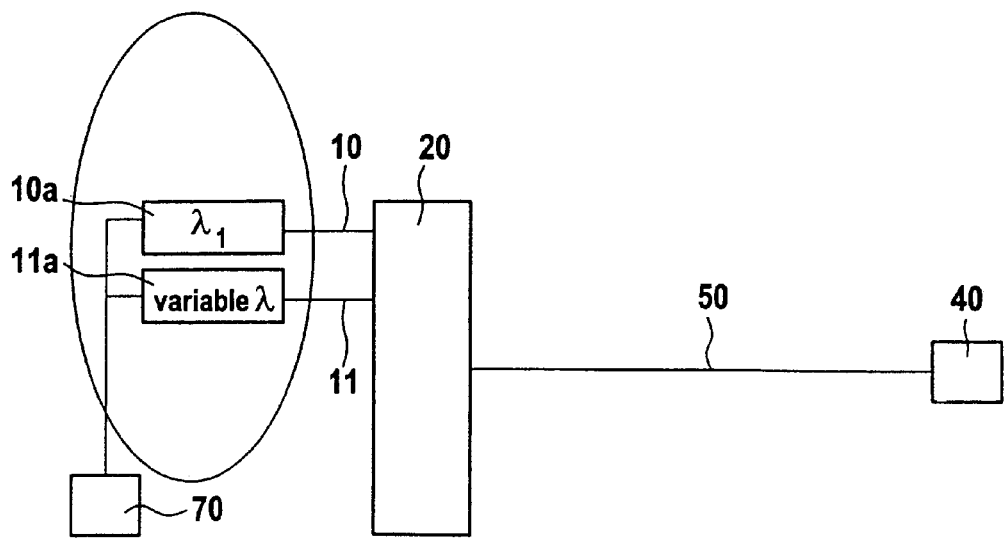

Referring now in greater detail to the drawings, FIGS. 5 and 6 show schematically examples of measurement setups for measuring the dispersion coefficient D according to embodiments of the present invention in a single-ended and dual-ended configuration, respectively.

The fixed wavelength of a light beam 10 is realized by a fixed laser source 10a emitting a fixed wavelength $\lambda_1$ and the variable wavelength of a light beam 11 is realized by a tunable laser source (TLS) 11a emitting a variable wavelength $\lambda$. TLS 11a can be tuned continuously or in discrete steps.

Instead of sending all wavelengths used for th measurement at a time as in the prior art described above, according to the displayed embodiments of the current invention only a light beam 10 having a wavelength "$\lambda_1$" and a light beam 11 having a wavelength "variable $\lambda$" are send through a DUT 50, e.g. a fiber under test, at a time. The wavelengths are modulated or pulsed by a modulator 70 and combined by a coupler 20. The modulator 70 can be implemented into the sources 10a and 11a (not shown) for direct modulation of these sources, can be placed outside like in FIGS. 5 and 6 for indirect modulation of these sources, and/or can be placed between coupler 20 and the DUT 50 (not shown).

For the single-ended approach, an additional coupler 30 is necessary. The two wavelengths $\lambda_1$ and variable $\lambda$ are received by a detector 40 in the dual-ended approach. In the single-ended approach the two wavelengths are reflected by an end reflex 60 send over the fiber 50 and the coupler 30 to the detector 40. The difference in the group delay between the fixed wavelength $\lambda_1$ and the variable wavelength $\lambda$ is measured by a computer (not shown) connected to the detector 40. For each wavelength that shall contribute to the measurements, this process is repeated.

With the described setups, one can also measure the CD of a DUT comprising an element (not shown) being selective to the wavelength of the light beams 10, 11 used for the measurement. One can also measure the CD of a DUT comprising an optical amplifying element (not shown).

Figure 7:
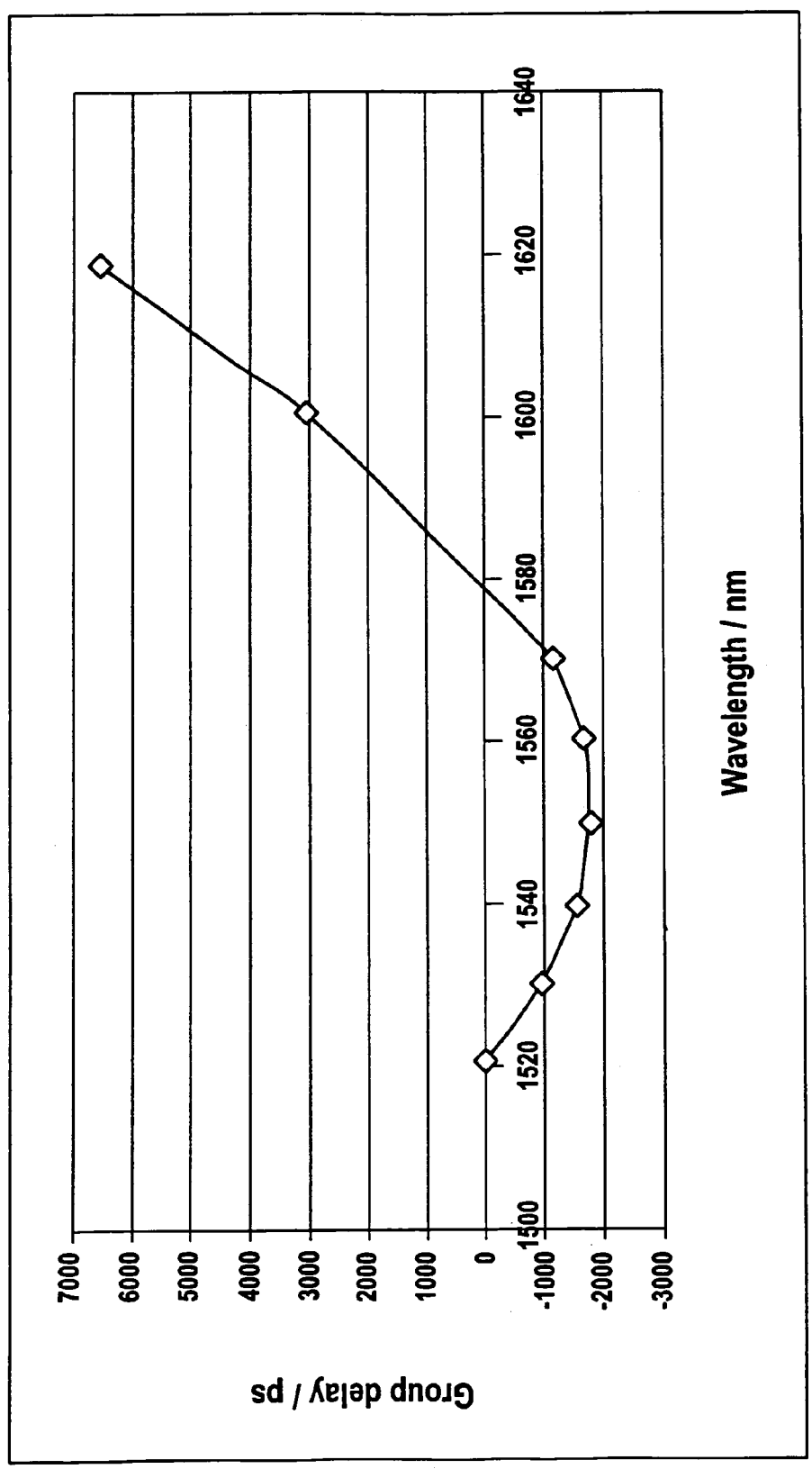
FIGS. 7 and 8 show graphs illustrating the results using the measurement setups of FIGS. 5 and 6.

FIG. 7 shows a graph displaying a result of a measurement using the setups of FIGS. 5 and 6. On the X-axis the wavelength is displayed, on the Y axis the resulting relative group delay between the signal with the variable wavelength and the signal with the fixed wavelength is displayed.

Figure 8:
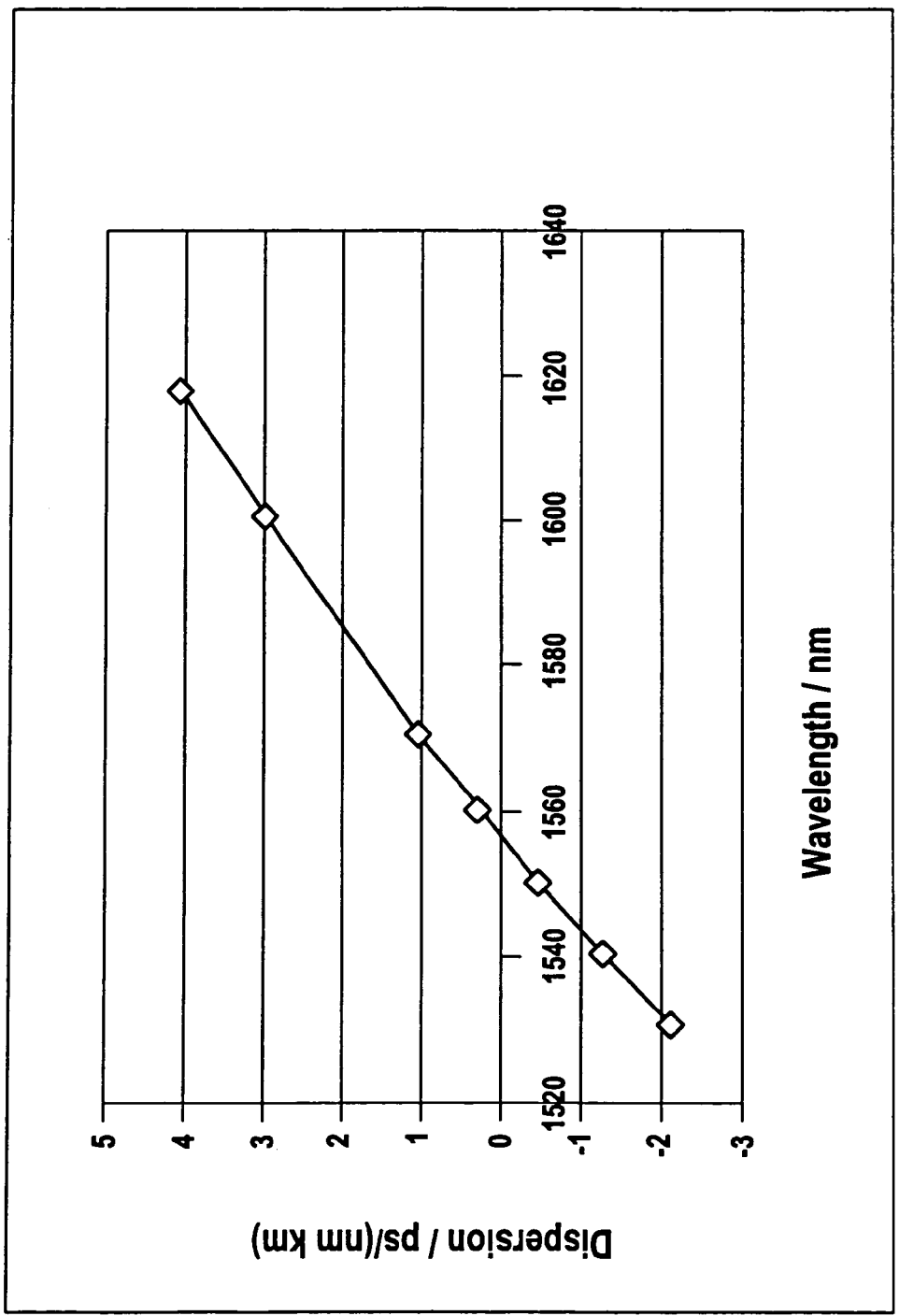

From the group delay the derivation $D = 1/L * d\lambda_{relativegroup}/d\lambda$ is derived, with L being the length of the fiber 50. D is the dispersion coefficient of the fiber 50. The dispersion coefficient D according to the results of the measurement shown in FIG. 7 is displayed on the Y-axis in the graph of FIG. 8 with the X-axis showing the wavelength.

What is claimed is:

1. A method of measuring an optical property of a DUT, comprising:
   a) coupling a first pulse shaped optical signal having a first wavelength and a second pulse shaped optical signal having a second wavelength into the DUT, the second wavelength being variable with respect to the first wavelength,
   b) detecting the first and the second pulse shaped signals leaving the DUT,
   c) determining a difference in runtime, if any, between the first and the second pulse shaped signal having traveled at least one time through the DUT by measuring a relative group delay between the first and the second pulse shaped signal having traveled at least one time through the DUT using a single detector, and
   d) deriving the optical property from the detected difference and
   e) repeating steps a) to c) at least n times while varying the second wavelength with respect to the first wavelength before deriving the optical property from at least two of the detected differences, with n being a natural number.

2. The method of claim 1, further comprising repeating steps a) to c) at least n times while linearly varying the second wavelength with respect to the first wavelength before deriving the optical property from at least two of the detected differences, with n being a natural number.

3. The method of claim 1, further comprising repeating steps a) to c) at least n times while continuously varying the second wavelength with respect to the first wavelength before deriving the optical property from at least two of the detected differences, with n being a natural number.

4. The method of claim 1, further comprising repeating steps a) to c) at least n times while varying the second wavelength in m steps from an initial wavelength to a mth wavelength with respect to the first wavelength before deriving the optical property from at least two of the detected differences, with n and m being natural numbers.

5. The method of claim 4, wherein m is equal to n.

6. The method of claim 1, further comprising repeating steps a) to c) at least n times while varying the second wavelength in m equal steps $\Delta\lambda$ from an initial wavelength to a mth wavelength with respect to the first wavelength before deriving the optical property from at least two of the detected differences, with n and m being natural numbers, $\Delta\lambda$ being a wavelength increment in nano-meter.

7. The method of claim 1, further comprising keeping the first wavelength fixed during steps a) to d).

8. The method of claim 1, further comprising determining a difference in runtime, if any, between the first and the second signal having traveled at least two times through the DUT.

9. A software program or product, stored on a data carrier, for executing the method of claim 1 when run on a data processing system such as a computer.

10. An apparatus for measuring an optical property of a DUT, comprising:
    a modulator for modulating a first optical signal and a second optical signal to generate first and second pulse shaped optical signals;
    a first coupler connected to the DUT for coupling the first pulsed shaped optical signal having a first wavelength and the second pulsed shaped optical signal having a second wavelength into the DUT, the second wavelength being variable with respect to the first wavelength,
    a single detector connected to the DUT for detecting the first and the second signal leaving the DUT,
    an evaluation unit connected to the detector, for determining a difference in runtime, if any, between the first and the second signal having traveled at least one time through the DUT by measuring a relative group delay between the first and the second pulse shaped signal having traveled at least one time through the DUT, and for deriving the optical property from the detected difference, and
    a fixed laser source for providing the first optical signal having a first wavelength and tunable laser source for providing the second optical signal having a second wavelength and for varying the second wavelength with respect to the first wavelength before deriving the optical property from at least two of the detected differences, the fixed laser source and the tunable laser source being connected to the coupler,
    wherein the apparatus is operable to couple the first optical signal and the second optical signal into the DUT, detect the first and the second signal leaving the DUT, determine the difference in runtime, at least n times while varying the second wavelength with respect to the first wavelength before deriving the optical property from at least two of the detected differences, with n being a natural number.

11. The apparatus of claim 10, further comprising:
    a second coupler connected to the DUT for coupling out the first optical signal and the second optical signal out of the DUT, the first and the second signal having traveled at least two times through the DUT when reaching the second coupler.

* * * * *